(No Model.)
G. GOETTING.
Sponge Holder.
No. 234,124. Patented Nov. 9, 1880.
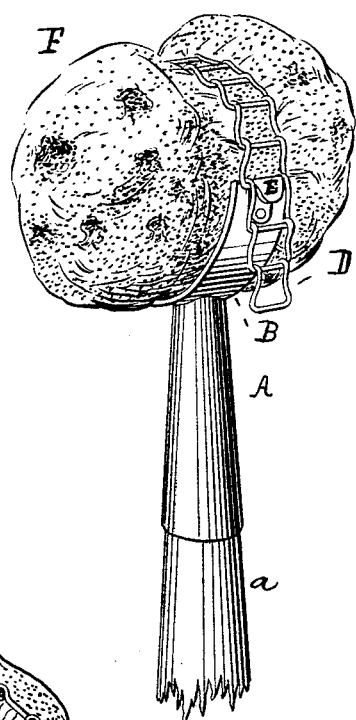
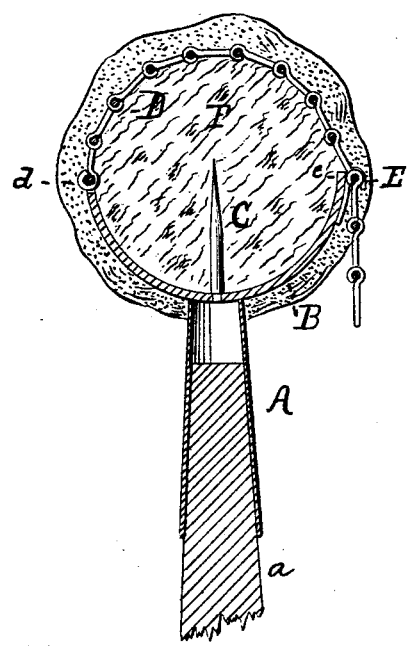
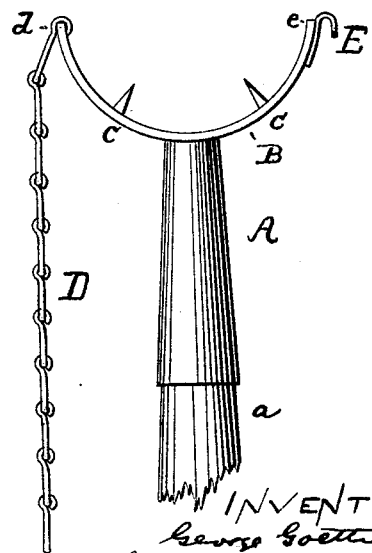

UNITED STATES PATENT OFFICE.

GEORGE GOETTING, OF NEW YORK, N. Y.

SPONGE-HOLDER.

SPECIFICATION forming part of Letters Patent No. 234,124, dated November 9, 1880.

Application filed September 17, 1880. (No model.)

*To all whom it may concern:*

Be it known that I, GEORGE GOETTING, of New York city, in the State of New York, have invented a new and Improved Sponge-Holder, of which the following is a description.

My invention relates to a new and improved sponge-holder for window, wall, or house-front cleaners, by which the sponge will be firmly and securely held in its place and allow of its being tightly pressed against the surface to be cleaned, while at the same time it can easily and readily be removed or replaced without lessening the strength of the holder, which is of great durability.

Figure 1 is a perspective view of my improved sponge-holder. Fig. 2 is a vertical section thereof, showing the sponge in the holder, and Fig. 3 a side view of a modification thereof without the sponge.

To the top of a pole, a, is fastened, in any suitable manner, a ferrule, A, of tin or other strong material, to the top of which is soldered, riveted, or otherwise secured the sponge-holder B, which is also made of tin or other strong material, preferably in form of a half-circle whose concave side is on the top. From the middle of the concave-holder B projects upward a pin, C, the upper pointed end of which is about level with the ends of said holder B.

To one end, d, of the holder B is hinged, in any suitable manner, the chain D. The length of this chain D is greater than would be required to complete the half-circle B to a full circle. The opposite end, e, of the holder B carries a suitable hook or projection, E, which can easily be passed through any link of the chain D.

The sponge F is placed into the holder B and impaled upon the pin C, so that said pin C will effectually prevent any lateral displacement of the sponge. The chain D is then passed over the sponge F and drawn tight, so as to properly compress the same, and then the free end of the chain is secured to the hook or projection E, thereby keeping the pressure of chain D upon the sponge F.

It will be seen that by this arrangement the sponge, even in its dry state, will be firmly and securely held, displacement in any direction being prevented, and after becoming saturated with water through its enlargement it will be still more firmly held.

Instead of the pin C small prongs c c may be used, as shown in Fig. 3.

The chain D may also be dispensed with, and in its place another semicircular plate, somewhat larger in circumference than the lower holder, B, placed over said holder B, and held in its place by a nut on the upper end of the pin C, in which case the pin C must project through the upper curved plate to receive the nut above the same; but I prefer the arrangement shown in the drawings as by far the most practicable and most readily adjusted to sponges of different sizes.

I claim—

1. The combination of the sponge-holder B, having concave upper face, with the pin C and chain D, substantially as herein shown and described.

2. The combination of the cup-shaped sponge-holder B, with the chain D fastened to it at one end, with the hook E at its other end, and with pin C, substantially as herein shown and described.

3. In a sponge-holder, the combination of flexible chain D with the concave sponge-receiver B, having hook E, substantially as herein shown and described.

GEORGE GOETTING.

Witnesses:
WILLY G. E. SCHULTZ,
WILLIAM H. C. SMITH.